United States Patent Office 3,642,796
Patented Feb. 15, 1972

3,642,796
PROCESS FOR THE PREPARATION OF
QUINOXALINE-DI-N-OXIDE-ALDEHYDE
Florin Seng, Cologne, and Kurt Ley, Odenthal-Globusch, Germany, assignors to Farbenfabriken Bayer Aktiengesellschaft, Leverkusen, Germany
No Drawing. Filed June 16, 1970, Ser. No. 46,814
Claims priority, application Germany, July 10, 1969,
P 19 34 887.9
Int. Cl. C07d 51/78
U.S. Cl. 260—250                                    7 Claims

ABSTRACT OF THE DISCLOSURE

Quinoxaline-di-N-oxide-aldehyde is produced by heating quinoxaline-di-N-oxide-hydroxy-lactone of the formula:

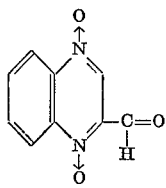

in an aqueous or organic diluent or in a mixture thereof to a temperature of from about 50° C. to about 150° C. until evolution of carbon dioxide has substantially ended.

---

The present invention is concerned with a new process for the production of quinoxaline-di-N-oxide-aldehyde.

Quinoxaline-di-N-oxide-aldehyde is a known compound which can be prepared by the reaction of methylquinoxaline-di-N-oxide-(1,4) with selenium dioxide (see U.S. Pat. No. 3,433,871). According to that process, the methyl group in the 2-position is oxidized to give the carbonyl group in the corresponding aldehyde.

It has now been found that quinoxaline-di-N-oxide-aldehyde can be obtained in high yield and in a simple manner without the use of selenium dioxide which is an expensive reactant.

More particularly, the present invention is concerned with a process for the production of quinoxaline-di-N-oxide-aldehyde which has the formula:

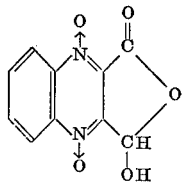

which comprises heating quinoxaline-di-N-oxide hydroxy-lactone of the formula:

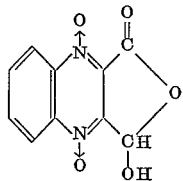

in an aqueous or organic diluent or in a mixture thereof, to a temperature of from about 50° C. to about 150° C. until the evolution of carbon dioxide is substantially ended.

The quinoxaline-di-N-oxide-lactone used as a starting material according to the process of the present invention may be obtained by the reaction of 2-dialkoxymethyl - 3-dialkylamino-carbonylquinoxaline-di-N-oxides with aqueous acids. A process for the production of quinoxaline-di-N-oxide-lactone is set forth in co-pending U.S. application Ser. No. 46,815, filed concurrently herewith.

According to the process of the present invention, the lactone is suspended in a diluent and heating is then effected to a temperature of about 50° C. to about 150° C., and preferably to a temperature of about 60° C. to about 100° C. The completion of the reaction can be determined by the cessation of the evolution of carbon dioxide. The quinoxaline-di-N-oxide-aldehyde obtained can be isolated and recovered according to techniques which are per se known in the art.

The preferred diluents in the process of the present invention are aqueous or organic, or a mixture of aqueous and organic diluents. Examples of such diluents include water, aqueous mineral acids, such as aqueous halogen hydracids, aqueous sulphuric acid and the like, aqueous solutions of sulphonic acids, alcohols, such as methanol, ethanol, n-propanol, iso-propanol, n-butanol and n-pentanol, dimethyl formamide, dimethyl sulphoxide, as well as mixtures of the above diluents with one another.

When dimethyl formamide, dimethyl sulphoxide, or mixtures thereof, are used as the diluent, the quinoxaline-di-N-oxide-aldehyde obtained is dissolved at an elevated temperature and, on cooling, separates in a relatively pure form, for example in an analytical grade form.

The reaction mechanism of the present invention may be represented as follows:

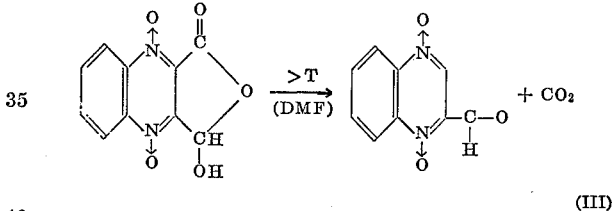

(III)

The process according to the present invention is particularly startling and unobvious since the extremely rapid and smoothly proceeding split-off of carbon dioxide and the consequent formation of quinoxaline-di-N-oxide-aldehyde was completely unexpected and could not be foreseen or anticipated by those of ordinary skill in the art.

The quinoxaline-di-N-oxide-aldehyde produced according to the process of the present invention is useful as an intermediate for the production of pharmaceutical products and itself shows antibacterial properties. The compound itself as indicated supra, is disclosed in U.S. Pat. No. 3,433,871.

The following non-limitative example more particularly illustrates the process of the present invention.

EXAMPLE 23.4 g. (0.1 mole) 1-oxo-3-hydroxy-1,3-dihydrofuro-(3,4-b)quinoxaline-4,9-dioxide are suspended in 100 ml. dimethyl formamide and heated to 100° C. At 50° C., vigorous evolution of gas begins; at 100° C., a clear solution has formed. After the evolution of gas has stopped, cooling is effected and the precipitate obtained is filtered off with suction. There are thus obtained 17 g. (89.5% of the theory) of quinoxaline-di-N-oxide-2-aldehyde of the melting point 199–202° C.

Analysis.—$C_9H_6N_2O_3$ (molecular weight 190). Calcd. (percent): C, 56.8; H, 3.18; N, 14.7. Found (percent): C, 56.7; H, 3.3; N, 14.6.

Preparation of the quinoxaline-di-N-oxide-hydroxy-lactone of Formula II used as starting material for the above example may be carried out as follows:

30.7 g. (0.1 mole) of 2-bis-methoxymethyl-3-dimethyl-amino-carbonylquinoxaline-di-H-oxide(1,4) are introduced into 100 ml. of 10%-strength aqueous hydrochloric acid. A clear solution forms and, after a short time, the compound of the Formula II separates in the form of a yellow precipitate which, after 6 hours, is filtered off with suction. There are thus obtained 17 g. (72.6% of the theory) of 1-oxo-3-hydroxy - 1,3 - dihydrofuro(3,4-b)quinoxaline-4,9-dioxide in the form of yellow crystals.

For purification, the compound is dissolved in sodium bicarbonate solution, filtration is effected and the filtrate is acidified. The purified compound melts at 156–159° C., with frothing up.

$C_{10}H_6N_2O_5$ (235). Calcd. (percent): C, 51.3; H, 2.6; N, 12.0. Found (percent): C, 52.0; H, 2.8; N, 12.6.

What is claimed is:

1. A process for the production of quinoxaline-di-N-oxide-aldehyde which comprises heating quinoxaline-di-N-oxide-hydroxy-lactone of the formula

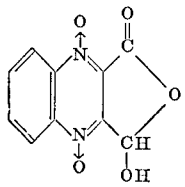

in an aqueous or organic diluent, or in a mixture thereof selected from the group consisting of water, an aqueous mineral acid, an aqueous solution of a sulphonic acid, an alcohol, dimethyl formamide, dimethyl sulphoxide, and a mixture of two or more of said diluents, to a temperature of from about 50° C. to about 150° C. until evolution of carbon dioxide has substantially ended.

2. A process according to claim 1 which comprises recovering the quinoxaline-di-N-oxide-aldehyde produced.

3. A process according to claim 1 wherein the lactone is suspended in the diluent.

4. A process according to claim 1 wherein the temperature is from about 60° C. to about 100° C.

5. A process according to claim 1 wherein the aqueous mineral acid is an aqueous halogen hydracid or aqueous sulphuric acid, and the alcohol is methanol, ethanol, n-propanol, iso-propanol, n-butanol or n-pentanol.

6. A process according to claim 1 wherein the diluent is dimethyl formamide, dimethyl sulphoxide, or a mixture thereof, and the quinoxaline-di-N-oxide-aldehyde produced is dissolved at an elevated temperature and, upon cooling, separates in a relatively pure form.

7. A process for the production of quinoxaline-di-N-oxide-2-aldehyde which comprises suspending 1-oxo-3-hydroxy-1,3-dihydrofuro(3,4-b)quinoxaline - 4,9 - dioxide in dimethyl formamide, heating the suspension to about 100° C. until the evolution of carbon dioxide has substantially ended, cooling the solution and recovering the quinoxaline-di-N-oxide-2-aldehyde produced.

References Cited

UNITED STATES PATENTS

| | | | |
|---|---|---|---|
| 3,398,141 | 8/1968 | Haddadin et al. | 260—250 R |
| 3,473,871 | 12/1968 | Johnston | 260—250 R |
| 3,479,354 | 11/1969 | Galt | 260—250 R |
| 3,493,572 | 2/1970 | Johnston | 260—250 R |

NICHOLAS S. RIZZO, Primary Examiner

UNITED STATES PATENT OFFICE
CERTIFICATE OF CORRECTION

Patent No. 3,642,796     Dated February 15, 1972

Inventor(s)  Florin Seng et al.

It is certified that error appears in the above-identified patent and that said Letters Patent are hereby corrected as shown below:

Please correct formula (III) by adding a double bond at the bottom of righ hand side of the formula. Formula (III) will read correctly:

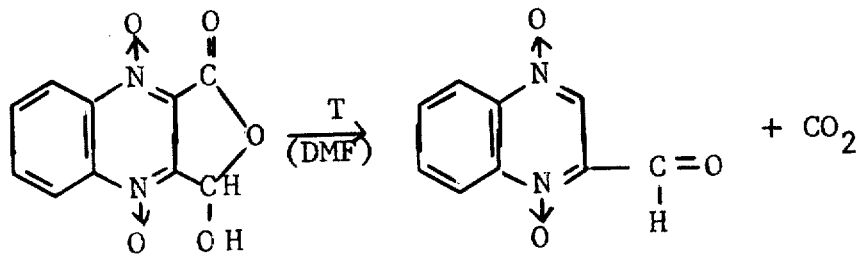

Signed and sealed this 20th day of June 1972.

(SEAL)
Attest:

EDWARD M. FLETCHER, JR.
Attesting Officer

ROBERT GOTTSCHALK
Commissioner of Patents